United States Patent [19]

Goransson et al.

[11] 3,808,538

[45] Apr. 30, 1974

[54] RADIO COMMUNICATION SYSTEM

[75] Inventors: Kjell Goransson, Sodertalje; Per Waerner, Bandhagen, both of Sweden

[73] Assignee: Sonab Development AB, Vallingby, Sweden

[22] Filed: Dec. 5, 1972

[21] Appl. No.: 312,370

[30] Foreign Application Priority Data

Dec. 6, 1971 Sweden ............................ 15642/71

[52] U.S. Cl. ...................... 325/55, 325/64, 325/352, 325/361, 325/492

[51] Int. Cl. ............................................ H04b 1/00

[58] Field of Search ............ 320/30, 48; 325/16, 55, 325/64, 119, 169, 185, 186, 352, 356, 361, 492–496

[56] References Cited

OTHER PUBLICATIONS

J. DeGraaf, Selective Paging System, Electronics, 2/26/60.

*Primary Examiner*—Albert J. Mayer
*Attorney, Agent, or Firm*—Eric H. Waters

[57] ABSTRACT

A wireless staff calling or paging system comprises a central transmitter station and a plurality of portable receivers, which can be called selectively and individually from the transmitter station by use of individual call signals, for instance in the form of tone codes, assigned to the receivers, and at least one storing rack with a plurality of storage compartments for the storing of temporarily non-used receivers belonging to persons who have left the area covered by the paging system and can no more be reached over the system. The paging system is provided with means for automatic absentee-indication to the transmitter station, when a receiver inserted in a storage compartment is called from the transmitter station. The absentee-indication does not require that the non-used receivers are deposited in individually assigned storage compartments, but a temporarily non-used receiver can be deposited in any convenient storage compartment. Only a single signal conductor is required from each storage compartment rack to the central transmitter station for the absentee-indication. The receivers inserted in the storage compartments are automatically "silenced" so that they can not emit any sound even if called-up from the transmitter station.

2 Claims, 3 Drawing Figures

RADIO COMMUNICATION SYSTEM

BACKGROUND OF THE INVENTION

1. Field of the Invention

The present invention relates to radio communication systems and in particular to wireless paging or staff calling systems comprising a transmitter station and a plurality of portable receivers which can be called selectively and individually from the transmitter station.

2. Description of the Prior Art

Wireless paging systems of this type are used within factories, offices, department stores, hotels, hospitals and similar plants in order to make it possible to reach predetermined persons independent of their present whereabouts within the plant. Each such person is provided with his own receiver, which he always carries along. When one wishes to get into contact with a given person, an individual call signal, for instance in the form of a tone code, assigned to the receiver used by said person is transmitted on a carrier wave from the central transmitter station. This individual call signal is received and detected by the receiver, which in response thereto is opened for a subsequent buzzer or bleep signal and possible following speech signals, which are supplied to and made audible in the loudspeaker of the receiver. Alternatively the buzzer or bleep tone may be generated internally in the receiver in response to the reception and detection of the call signal tone code assigned to the receiver. If the system is not designed for voice communication; no speech signals are transmitted from the transmitter station, but the user of the receiver will by the bleep tone in the loudspeaker of the receiver be notified that he is wanted, whereafter he will have to get in contact with the transmitter station or the telephone switchboard of the plant on the telephone system of the plant. The transmitter station can be operated by an operator or alternatively be connected to an automatic telephone exchange, whereby it becomes possible to be connected from a telephone set through the telephone exchange to the transmitter unit of the paging system for the transmission of a call signal and the establishing of a communication connection to a wanted receiver in the paging system.

In a paging system of this type it is necessary that the transmitter station can be informed that a person, who is associated with the system and thus provided with a personal receiver, has left the area or plant covered by the paging system and therefore can no longer be reached over the system. In most prior art wireless paging systems such an absentee-indication is obtained in that an individually assigned storage compartment is provided for each receiver, in which storage compartment the user of the receiver must deposite his receiver when leaving the plant. There is consequently provided an individually assigned storage compartment for each receiver in the system. When the receiver is inserted in its associated storage compartment, the receiver actuates an electric contact or a similar device in the storage compartment, thereby a signal is produced on a conductor leading from the storage compartment to the central transmitter unit. In the central transmitter unit this signal can be used for indicating that the user of the receiver is absent and can not be reached over the paging system. In the central transmitter unit these individual indication signals can for instance be used for operating a panel of indicator lamps (one for each receiver).

This previously known method for absentee-indication in a wireless paging system has, however, several serious disadvantages. Thus, a separate signal conductor is required from each storage compartment to the central transmitter unit. In a system comprising a large number of receivers and corresponding storage compartments located in several different places remote from each other and from the central transmitter unit, this means a very expensive and costly electric wiring between the storage compartments and the central transmitter unit. Further, a person associated with the paging system must, when he leaves the area covered by the system, first deposit his receiver in the storage compartment individually assigned to that particular receiver. In plants covering large areas and having many exits, as for instance factory plants, hospitals, department stores and similar, this is obviously very inconvenient, as the user of the receiver can not leave the plan through the closest and therefore most convenient exit but must first go to the storage compartment provided for his receiver.

There is also known in the prior art a different method for absentee-indication in wireless paging systems, which method has the advantage of requiring neither individually assigned storage compartments for the receivers nor a separate signal conductor from each storage compartment to the transmitter unit. Paging systems provided with this type of absentee-indication are disclosed in the German patent specification 1,259,744 and the Swiss patent specification 417,410. In this method for absentee-indication use is made of the audio frequency bleep signal which is transmitted from the transmitter station or alternatively generated internally in the called-up receiver subsequent to the transmission and reception of the individual call signal for the receiver. This is achieved in that the acoustic bleep tone from the loadspeaker in the receiver is picked up by means of a microphone mounted close to the storage compartment in which the receiver is inserted and transferred on a conductor to the central transmitter station. Alternatively the electro magnetic field produced by the coil of the loadspeaker in response to the bleep signal may be picked up inductively or the audio frequency bleep signal may be picked up through galvanic contacts from the receiver. The German patent specification 1,125,744 discloses also a somewhat different method for abseentee-indication, in which use is made of the sudden increase in the power consumption of the receiver which occurs when the audio frequency amplifier in the receiver is opened in response to the reception and detection of the call signal of the receiver for amplification of the subsequent bleep signal and any following speech signals. These prior art methods for absentee-indication have the common disadvantage that they require that audio frequency amplifiers in the receivers deposited in the storage compartments are kept permanently open or at least are opened when called-up from the transmitter station, which means that receivers deposited in the storage compartments will emit sound, for instance in the form of bleep tones, when called-up from the transmitter station, which sound can become very disturbing in the neighbourhood of a rack containing a large number of storage compartments for receivers.

SUMMARY OF THE INVENTION

The object of the present invention is therefore to provide a wireless paging system with improved means for absentee-indication.

For this object the invention provides a radio communication system, in particular a wireless paging system, which comprises a central transmitter unit and a plurality of portable receivers, which can be called selectively from the transmitter unit by use of individual call signals assigned to the receivers, each receiver including a call detector for receiving and detecting call signals transmitted from the transmitter unit and for generating an internal call detection signal in the receiver upon detection of the individual call signal assigned to the receiver and an audio frequency amplifier and a loudspeaker for amplifying and reproducing acoustically any audio frequency signals being transmitted from the transmitter unit to the receiver subsequent to the call signal, and at least one rack containing a plurality of storage compartments for the storing of temporarily non-used receivers, each such storage compartment being provided with a first electric contact and each receiver being provided with a corresponding first external electric contact on its casing adapted to be connected with a said first electric contact in a storage compartment upon insertion of the receiver in the storage compartment, and a common signal conductor connecting said first electric contacts in all said storage compartments in said rack with said transmitter unit, characterized in that the output of the call detector in each receiver is connected to said first external electric contact on the casing of the receiver so that the call detection signal generated by the call detector is supplied to said first external electric contact on the receiver casing and, if the receiver is inserted in a storage compartment, through said first electric contact in the storage compartment holding the receiver and said common signal conductor to said transmitter unit to be used therein for absentee-indication, and that each storage compartment is provided with a second electric contact connected to a predetermined voltage potential and that the audio frequency amplifier in each receiver is provided with a cut-off biasing input connected to a corresponding second external electric contact of the casing of the receiver, which is adapted upon insertion of the receiver in a storage compartment to be connected with said second electric contact in the storage compartment, whereby the audio frequency amplifier of the receiver is permanently cut-off under the influence of said predetermined voltage potential being applied to the cut-off biasing input of the amplifier through said second electric contacts in the storage compartment and on the receiver casing respectively.

Contrary to previously known systems for absentee-indication in wireless paging systems, the invention utilizes the internal call detection signal in the receiver, which is generated by the call detector of the receiver upon reception and detection of the individual call signal assigned to the receiver. Further, in the system according to the invention the audio frequency amplifier of a receiver is automatically and permanently cut-off, when the receiver is inserted in a storage compartment, by means of a cut-off biasing voltage supplied from an electric contact in the storage compartment to a corresponding external electric contact on the receiver casing.

The invention has the advantages that a person provided with a receiver can deposit his receiver in any arbitrary convenient storage compartment when he leaves the area or plant covered by the paging system and that only a single signal conductor is required for the absentee-indication from each rack of storage compartments to the central transmitter station. An additional advantage provided by the invention is that all non-used receivers inserted in the storage compartments are kept permanently "silenced" even if they are called-up from the transmitter station, wherefore the receivers can never emit any distrubing sound, as for instance in form of bleep tones. The invention has also the advantage that a more rapid absentee-indication is obtained, as it is not necessary to wait for the transmission of generation of a bleep signal, but the absentee-indication is received in the transmitter station as soon as the call detector of the called-up receiver has detected the transmitted call signal. This gives also the additional advantage that upon reception of an absentee-indication in the transmitter station the transmission of a subsequent bleep signal can be cancelled.

BRIEF DESCRIPTION OF THE DRAWINGS

In the following the invention will be further described with reference to the accompanying drawings, which show by way of example an embodiment of the invention. In the drawings

Fig. 1 shows schematically and by way of example a rack 1 for twenty storage compartments 2 for the receivers in a wireless paging system. The drawing shows by way of example two receivers 3 inserted in two of the storage compartments. Each storage compartment 2 is provided with a relatively thin plate or sheet 4, which upon insertion of a receiver 3 in the compartment 2 projects underneath a spring clip 5 on the receiver between the clip and the casing of the receiver. This is more clearly illustrated in FIG. 2, which shows schematically a number of storage compartments 2 provided with associated plates 4 and a receiver 3 inserted in one of these compartments so that the plate 4 in the compartment is located between the casing of the receiver and the spring clip 5 of the receiver. In normal use of the receiver 3 the clip 5 is intended to be used for holding the receiver in a pocket or the like.

Figure 1:
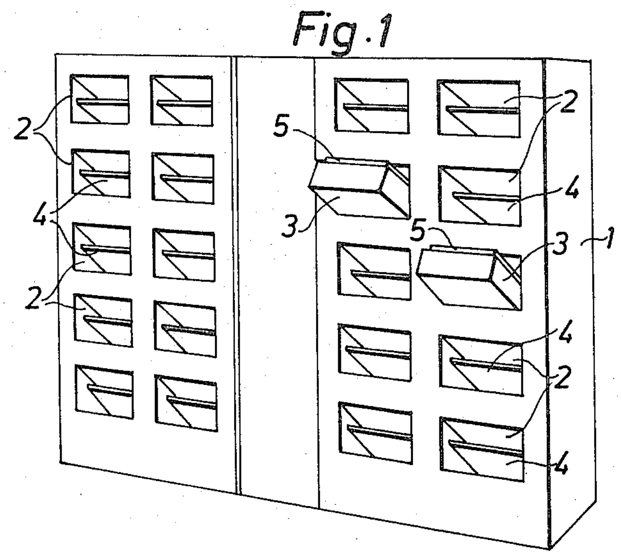
FIG. 1 is a schematic perspective view of a rack containing a number of storage compartments for receivers in a wireless paging system according to the invention.

The plate 4 in each storage compartment 2 is provided with a number of electric contacts, which upon insertion of a receiver 3 in the compartment are automatically connected to corresponding electric contacts provided on the casing of the receiver 3 underneath the clip 5. As shown most clearly in FIGS. 2 and 3, the plate 4 in each compartment 2 is in the illustrated embodiment of the invention provided with three separate contacts 6, 7 and 8 respectively, whereas the casing of each receiver 3 is provided with corresponding three contacts 9, 10 and 11 respectively.

Figure 2:
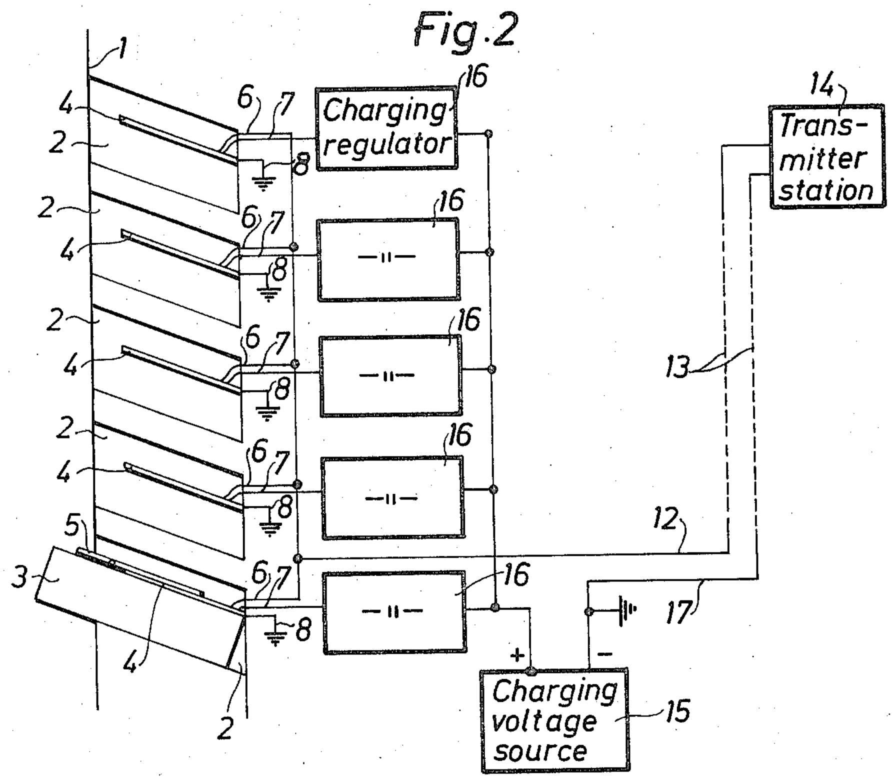
FIG. 2 shows schematically a number of storage compartments with associated means for absentee-indication to the central transmitter unit from receivers inserted in the storage compartments and for recharging the power supply batteries in the receivers inserted in the compartments.

As can be seen in FIG. 2, the contacts 6 in all storage compartments 2 in the rack 1 are jointly connected, possibly through non-illustrated gate circuits, isolating the different contacts 6 from each other, to the one conductor in a two-wire cable 13, which leads to the central transmitter unit 14 of the paging system. The second contact 7 on the plate 4 in each storage compartment 2 in the rack 1 is connected to one pole of a charging current source 15 through a charging controller 16 individually assigned to the storage compartment for controlling or regulating the charging current. Thus, the charging current source 15 is common for all storage compartments 2 in the rack 1. The second pole of the charging current source 15 is connected to earth and to the second conductor 17 in the two-wire cable 13 leading to the central transmitter unit 14. The third contact 8 on the plate 4 in each storage compartment 2 in the rack 1 is connected to earth.

When a receiver 3 is inserted in a storage compartment 2 in the rack 1, the voltage of the charging current source 15, which is connected between the contacts 7 and 8 on the plate 4 in the compartment, will be supplied through the corresponding contacts 10 and 11 on the casing of the receiver 3 to the power supply battery in the receiver, thereby a recharging of the battery is started. The charging controller 6 in the charging current path is time-controlled in such a manner that after a predetermined charging time the charging current is reduced to a value substantially corresponding to the normal power consumption of the receiver 3. In this way an over-charging of the battery of the receiver 3 and an unnecessarily large power consumption for the charging current source 15 is avoided. Further, the charging voltage present between the contacts 7 and 8 is utilized in the receiver 3 for operating a voltage responsive means, which interrupts the internal audio signal path within the receiver to the loudspeaker of the receiver. In this way the receiver is "silenced" when inserted in the storage compartment 2 so that the receiver can not emit any acoustic signals, that is noise, when called-up from the transmitter unit 14.

Further, each receiver 3 includes means for detecting the call signal, for instance in the form of a tone code, being transmitted from the transmitter unit 14 when calling a receiver, and for determining whether the transmitted call signal is the individual call signal assigned to the receiver concerned and in such a case to generate a call detection signal constituting a criterion of the reception of the call signal for the receiver concerned. This call detection signal from the call detecting means in the receiver 3 is supplied to the contact 9 on the casing of the receiver and consequently to the contact 6 of the plate 4 in the storage compartment 2 in which the receiver is inserted. Consequently, if the transmitter unit 14 transmits the call signal for a receiver 3 which is inserted in one of the storage compartments 2 in the rack 1, a signal will be automatically supplied from this receiver on the cable 13 to the transmitter unit 14, which in this way receives an indication that the called-up receiver is inserted in a storage compartment 2 and consequently that the user of the receiver is absent and cannot be reached over the paging system.

It is appreciated tht the absentee-indication described above will be obtained independent of the particular storage compartment 2 in which the called-up receiver is inserted. It is also obvious that only a common signal connection 13 from all storage compartments 2 to the central transmitter unit 14 is necessary for each compartment rack 1. If, as in most cases, the system comprises several storage compartment racks 1 located in different places, there is nothing to prevent several of these racks from having at least partly a common signal cable for the absentee-indication to the central transmitter unit, if this should be preferable in view of the locations of the different racks 1 relative to the transmitter unit.

In the transmitter unit 14 the absentee-indication signals received on the cable 13 may be converted into acoustic signals audible for the operator of the transmitter unit. As only a single signal path is required for the absentee-indication signals, these may also without any extensive or expensive arrangements be transferred to several different control sites, from which the transmitter unit 14 of the paging system may be remotely controlled. IF the paging system is connected to a telephone system for the plant served by the paging system so that the telephone subscribers can be connected from their telephone sets to the paging system for calling those persons within the staff that are provided with receivers of the paging system, it is also possible without any difficulties or any high costs to transfer the absentee-indication signals to the exchange of the telephone system and therefrom to the telephone set of the calling subscriber to be made audible in the telephone set as an acoustic absentee-signal.

Figure 3:
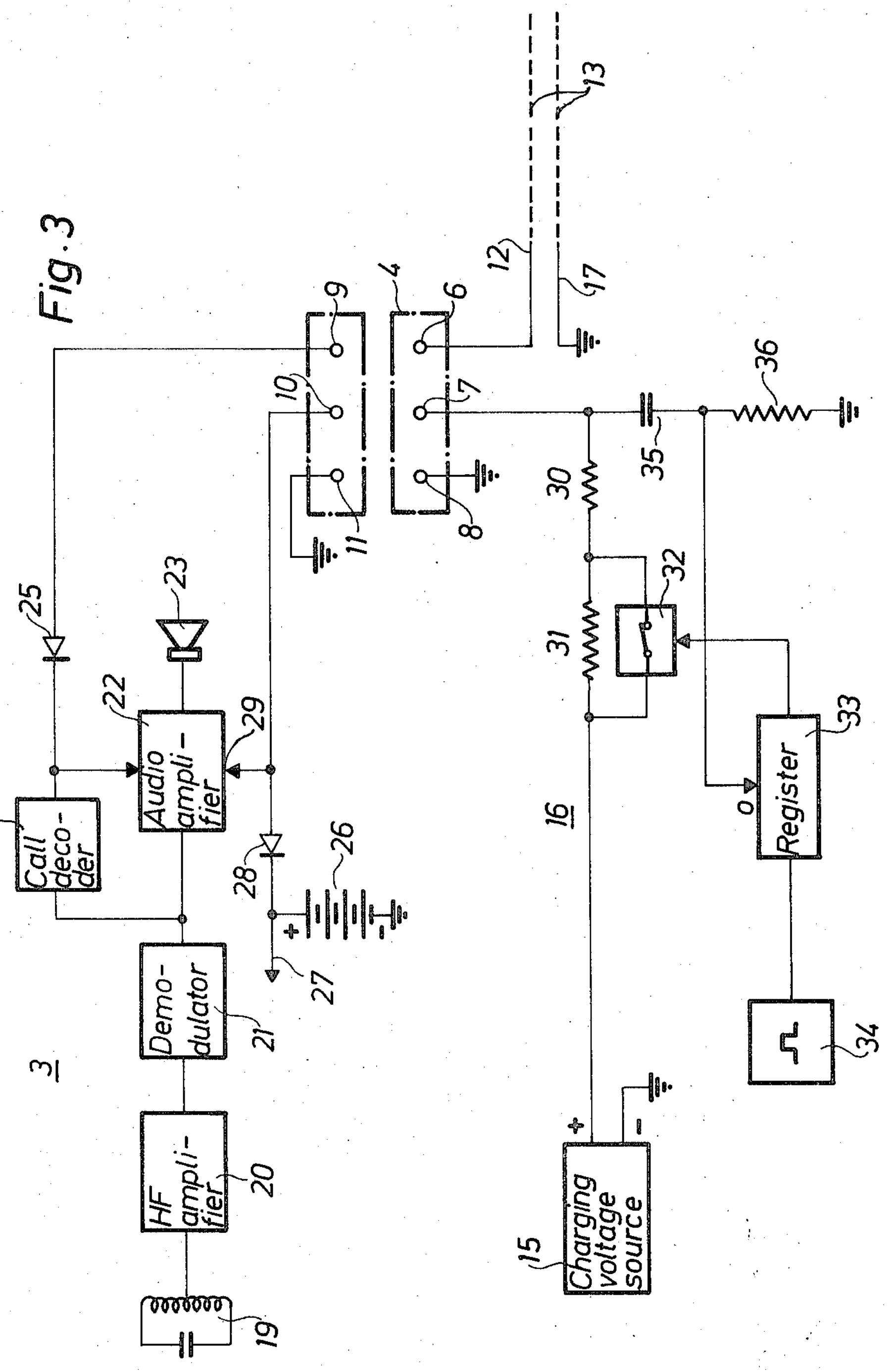
FIG. 3 shows schematically and by way of example the circuit diagram for a receiver and a device for controlling the charging current to a receiver inserted in a storage compartment.

FIG. 3 shows by way of example a design of the receiver 3 and the charging controller 16 which can be used as a paging system according to the invention.

The receiver 3 comprises in conventional manner an antenna circuit 19 for receiving the carrier wave being transmitted from the central transmitter unit 14 when a receiver is called. As mentioned in the foregoing, this carrier signal is modulated with the individual call signal, for instance consisting of a tone code, which is assigned to the receiver being called. The modulated carrier signal received by the antenna circuit 19 is amplified in a high frequency amplifier 20 and demodulated in a demodulator 21, on the output of which the tone signal modulated on the received carrier signal will appear. This tone signal consists initially of the individual call signal assigned to the called-up receiver and thereafter of a bleep tone and finally of a speech signal. The demodulated tone signal on the output of the demodulator 21 is supplied to an audio frequency amplifier 22, which has its output connected to the loudspeaker 23 of the receiver. However, the audio frequency amplifier 22 is normally cut off so that no audio frequency signals are permitted to reach the loudspeaker 23. The audio amplifier 22 can be opened in response to a signal from a call detector 24. This call detector 24 receives on its input the tone signal on the output of the demodulator 21 and is adapted to detect the call signal being sent first when the receiver is called-up and, if the detected call signal is identical to the individual call signal assigned to the receiver in question, to generate a call detection signal on its output for opening the audio amplifier 22. Such a call detector, which can be used for detecting call signals consisting of tone codes, is for instance described in the Swedish patent application 15641/71. In the embodiment of the present invention illustrated by way of example in FIG. 3 is is assumed that the call detector 24 is of the type described in said patent application, wherefore consequently the call detection signal appearing on the output of the call detector 24 upon reception and detection of the individual call signal for the receiver in question will consist therein that the output of the call detector 24 assumes the earth potential.

The output of the call detector 24 is also connected through a diode 25 to the contact 9 on the casing of the receiver 3 and thus, when the receiver is inserted in a storage compartment 2, to the contact 6 on the contact plate 4 in the storage compartment and to the conductor 12 in the cable 13 to the transmitter unit 14. Consequently, if the receiver 3 is inserted in the storage compartment 2 and receives a call from the transmitter unit 14 intended for said particular receiver, this will cause that earth potential appears on the output of the call detector 24, which means that the two conductors 12 and 17 in the two-wire cable 13 leading to the transmitter unit 14 are short-circuited at the storage compartment. In the transmitter unit 14 this short-circuit can be used as an indication of the fact that the called-up receiver is inserted in a storage compartment.

The receiver 3 comprises also a rechargable power supply battery 26, which supplies all circuits in the receiver, as schematically indicated by a feeder conductor 27. The positive pole of the battery 26 is connected through a diode 28 to the external contact 10 on the casing of the receiver and is consequently, when the receiver is inserted in a storage compartment, connected to the contact 7 on the contact plate 4 in the compartment and thus to the positive pole of the charging current source 15 thorugh the charging controller 16 provided for said storage compartment.

The external contact 10 on the casing of the receiver 3 is also connected to a cut-off biasing input of the audio frequency amplifier 22, which is adapted to be kept permanently cut-off independent of the potential on the output from the call detector 24, if a positive potential is present on said cut-off biasing input at least corresponding to the sum of the terminal voltage of the power supply battery 26 and the forward voltage drop of the diode 28. It is appreciated that with the receiver in normal use and not inserted in any storage compartment no voltage at all will be present on the cut-off biasing input 29 of the audio amplifier 22, wherefore the audio amplifier 22 is responsive exclusively to the output signal from the call detector 24. When, however, the receiver 2 is inserted in a storage compartment and thereby connected through the external contact 10 on the casing of the receiver and the contact 7 on the contact plate 4 in the storage compartment to the charging current source 15, such a positive potential will automatically appear upon the cut-off biasing input 29 of the audio amplifier 22 that the amplifier is cut-off and the signal path to the loudspeaker 23 is interrupted. In this way the receiver is kept "silenced," even if a call intended for the receiver in question should be received and the call detector 24 then produce a call detection signal on its output. The only thing that will happen in such a situation is that this call detection signal is transferred to the central transmitter unit 14 as described in the foregoing.

The charging controller 16 comprises two current limiting resistors 30 and 31 which are inserted in the charging current path between the charging current source 15 and the contact 7 on the plate 4. The resistor 31 is shunted by a transistor switch 32, which is controlled by a binary register 33, which is driven by a pulse train from a pulse generator 34. The binary register 33 may be of any conventional design such that it can count up to a predetermined maximum count, at which the register stops and generates an output signal, which opens the transistor switch 32. The transistor switch 32 is consequently normally closed so as to short-circuit the resistor 31 and is not open until the register 33 has reached its predetermined maximum count.

The contact 7 on the contact plate 4 in the storage compartment is also connected to earth through a capacitor 35 in series with a resistor 36. The junction point between the capacitor 35 and the resistor 36 is connected to the reset terminal of the register 33.

When no receiver 33 is inserted in the storage compartment, the capacitor 35 is charged substantially to the voltage of the charging current source 15, which voltage is assumed to exceed the voltage of the power supply battery 26 in the receivers 3. When a receiver is inserted in a storage compartment, an initial discharge current surge flows from the capacitor 35, which produces a negative voltage pulse on the reset terminal of the register 33 so that the register 33 is reset to its starting condition. As mentioned above, this causes a closing of the transistor switch 32 so that the power supply battery 26 in the receiver 33 inserted in the storage compartment will be charged with a current determined solely by the current limiting resistor 30. Simultaneously the register 33 is starting to count in response to the pulse train from the pulse generator 34, which has a predetermined frequency. When the register 33, after a time interval determined by the frequency of the pulse train, reaches its predetermined maximum count and generates a signal on its output, the transistor switch 32 is opened in response to this output signal from the register, whereby also the current limiting resistor 31 becomes inserted in the charging current path and the charging current to the battery 26 in the receiver 3 is reduced. The resistors 30 and 31 are selected to give jointly a charging current to the power supply battery 26 substantially corresponding to the average power consumption in the receiver 3. Therefore, during the subsequent storing of the receiver 3 in the storage compartment 2 the receiver is actually supplied with power from the charging current source 5 through the charging controller 16 without any substantial charging or discharging of the battery 26 in the receiver. The duration of the charging interval with a high charging current can be varied by variation of the pulse frequency of the pulse generator 34, wherefore the pulse generator 34 is preferably designed to have a variable pulse frequency. It is appreciated that the pulse generator 34 can be common for all charging controllers 16 in a storage compartment rack 1.

It is appreciated that in addition to the embodiment of the invention described in the foregoing also several other designs of a paging system are possible within the scope of the invention. Thus, for instance, the internal design of the receivers can of course be varied considerably, provided that the receivers comprise means for generating in internal electric signal upon reception and detection of a call signal transmitted from the central transmitter unit and intended for the receiver in question. Further the means for the automatic cut-off of the internal audio signal path in receiver to the loudspeaker of the receiver, when the receiver is inserted in a storage compartment, may be of a different design from that used in the embodiment of the invention described in the foregoing. Also the external electric contacts on the casing of the receiver and the corresponding electric contacts in the storage compartment can of course be arranged in various other ways. Also the charging current controllers associated with the storage compartments for controlling the charging current to the receivers inserted in the storage compartments may of course be of a different design.

We claim:

1. A radio communication system, in particular a wireless paging system, comprising a central transmitter unit and several portable receivers, which can be called selectively from said transmitter unit by use of individual call signals assinged to the receivers, each of said receivers including a call detector for receiving and detecting call signals transmitted from said transmitter unit and for generating upon detection of the individual call signal assigned to said receivers and internal call detection signal on its output and an audio frequency amplifier and a loudspeaker for amplifying and acoustically reproducing audio frequency signals transmitted from said transmitter unit to said receiver subsequent to said call signal, at least one rack including several storage compartments for the storing of temporarily non-used receivers, each such compartment being provided with a first electric contact and each receiver being provided with a corresponding first external electric contact on its casing adapted upon insertion of the receiver in a storage compartment to be connected to said first electric contact in the storage compartment, a common signal conductor connecting said first electric contacts in all said storage compartments to said transmitter unit, the output of said call detector in each receiver being connected to said first external electric contact on the casing of the receiver so that said call detection signal from said call detector is supplied to said first electric contact on the casing of the receiver and, if the receiver is inserted in a storage compartment, through said first electric contact in said storage compartment and said common signal conductor to said transmitter unit to be used therein as an absentee-indication, and each storage compartment being provided with a second electric contact connected to a predetermined potential and said audio frequency amplifier in each receiver being provided with a cut-off biasing input connected to a second external electric contact on the casing of the receiver adapted upon insertion of the receiver in a storage compartment to be connected to said second electric contact in the storage compartment, whereby the audio frequency amplifier is cut-off under influence of said predetermined potential then being connected from said second electric contact in the storage compartment to said cut-off biasing input of the audio amplifier.

2. A system as claimed in claim 1, wherein each receiver includes a rechargable power supply battery having one pole connected to said second external electric contact on the casing of the receiver, and said rack is provided with a charging current source having one pole connected to said second electric contact in each of said storage compartments in said rack, whereby the power supply battery of the receiver is recharged from said charging current source when the receiver is inserted in one of said storage compartments and the voltage potential of said one pole of said charging current source is applied to said cut-off biasing input of said audio frequency amplifier in the receiver so as to effect the cut-off of said audio amplifier.

* * * * *